United States Patent
Koh

(10) Patent No.: US 7,417,412 B2
(45) Date of Patent: Aug. 26, 2008

(54) DC-DC CONVERTER UTILIZING A MODIFIED SCHMITT TRIGGER CIRCUIT AND METHOD OF MODULATING A PULSE WIDTH

(75) Inventor: Kyoung-Min Koh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 359 days.

(21) Appl. No.: 11/369,799

(22) Filed: Mar. 7, 2006

(65) Prior Publication Data

US 2006/0220627 A1 Oct. 5, 2006

(30) Foreign Application Priority Data

Mar. 29, 2005 (KR) .................. 10-2005-0026110

(51) Int. Cl.
*G05F 1/40* (2006.01)
(52) U.S. Cl. ...................... 323/285; 323/284
(58) Field of Classification Search ............... 323/282, 323/284, 285, 286, 351
See application file for complete search history.

(56) References Cited

U.S. PATENT DOCUMENTS

| 5,481,178 A | 1/1996 | Wilcox et al. | |
| 5,770,940 A | 6/1998 | Goder | |
| 6,683,797 B2 * | 1/2004 | Zaitsu et al. | ............... 363/16 |
| 6,696,825 B2 * | 2/2004 | Harris et al. | ............... 323/282 |

FOREIGN PATENT DOCUMENTS

JP 08289535 1/1996

\* cited by examiner

*Primary Examiner*—Jessica Han
(74) *Attorney, Agent, or Firm*—F. Chau & Associates, LLC

(57) ABSTRACT

A DC-DC converter includes a PWM modulator, a power switch and a filter. The PWM modulator positively feeds back a pulse width modulated signal of which a pulse width and a frequency are varied to generate an oscillated signal, amplifies a difference between a negatively fed-back direct current output signal and a reference signal to output a first signal, and compares the first signal with the oscillated signal to generate first and second switching signals. The power switch transfers an input signal to a first output node in response to the first and second switching signals, and generates the pulse width modulated signal, wherein the pulse width modulated signal is provided to the first output node. The filter generates a direct current output voltage signal in response to the pulse width modulated signal, wherein the direct current output voltage signal is provided to a second output node.

11 Claims, 17 Drawing Sheets

US 7,417,412 B2

DC-DC CONVERTER UTILIZING A MODIFIED SCHMITT TRIGGER CIRCUIT AND METHOD OF MODULATING A PULSE WIDTH

CROSS-REFERENCE TO RELATED PATENT APPLICATION

This application claims priority to Korean Patent Application No. 2005-26110, filed on Mar. 29, 2005, the contents of which are herein incorporated by reference in its entirety.

BACKGROUND OF THE INVENTION

1. Technical Field

The present invention relates to a DC-DC converter and a method of controlling the same. More particularly, the present invention relates to a DC-DC converter utilizing a modified Schmitt trigger circuit and a method of modulating a pulse width.

2. Description of the Related Art

DC-DC converters are used in many types of mobile electronic devices to provide a fixed output voltage. Pulse width modulation (PWM) has become a widely-used technique for controlling DC-DC converters. The DC-DC converter employing a conventional PWM method compares a reference input signal with a ramp signal outputted from an oscillator and generates a pulse signal having a duty cycle (or a duty ratio) that is proportional to the reference input signal. The pulse signal is amplified by a power switch and rectified by a filter consisting of an inductor and a capacitor to generate an output voltage that is proportional to the reference input signal. The output of the DC-DC converter is stabilized by a negative feedback circuit.

The conventional DC-DC converter that includes the oscillator for generating the ramp signal takes up a large amount of chip space in a semiconductor integrated circuit and exhibits relatively high power consumption.

Examples of DC-DC converters that generate an oscillated signal using a feedback loop without using an oscillator are disclosed in U.S. Pat. Nos. 5,481,178 and 5,770,940. FIG. 1 is a circuit diagram illustrating the conventional DC-DC converter having dual feedback loops as disclosed in U.S. Pat. No. 5,770,940.

The DC-DC converter shown in FIG. 1 is an example of a step-down switching regulator. Referring to FIG. 1, the switching regulator includes an error amplifier 106, a comparator 102, a switch 84, and an LC filter 86 consisting of an inductor 88 and a capacitor 90.

The switch 84 includes an input 92, an output line 94, and a control line 96. A diode 98 provides a current path for the inductor 88 when the switch 84 is opened. As shown in FIG. 1, the switching regulator circuit includes two feedback loops, i.e., a first feedback loop 100 including a first feedback circuit 114, and a second feedback loop 104 including a second feedback circuit 113.

The first feedback loop 100 is a quick response feedback loop that includes the comparator 102 and a driver (not shown). The comparator 102 includes built-in hysteresis, thereby providing a hysteretic window defining an upper voltage limit and a lower voltage limit.

The second feedback loop 104 is a relatively slow response feedback loop that includes the error amplifier 106. The slow response feedback loop can be used to sense a voltage at a point external to the DC-DC converter.

In the conventional DC-DC converter shown in FIG. 1, frequency of an output voltage VOUT is determined by the comparator 102 with built-in hysteresis.

SUMMARY OF THE INVENTION

Exemplary embodiments of the present invention provide a DC-DC converter and a method of modulating a pulse width.

In an exemplary embodiment of the present invention, a DC-DC converter includes a pulse width modulation (PWM) modulator, a power switch and a filter. The PWM modulator is configured to positively feed back a pulse width modulated signal of which a pulse width and a frequency are varied to generate an oscillated signal, configured to amplify a difference between a negatively fed-back direct current output signal and a reference signal to output a first signal, and configured to compare the first signal with the oscillated signal to generate a first switching signal and a second switching signal. The power switch is configured to transfer an input signal to a first output node in response to the first switching signal and the second switching signal, and configured to generate the pulse width modulated signal, wherein the pulse width modulated signal is provided to the first output node. The filter generates a direct current output voltage signal in response to the pulse width modulated signal, wherein the direct current output voltage signal is provided to a second output node.

In an exemplary embodiment of the present invention, a DC-DC converter includes an amplifier, a comparator, a switch driver, a power switch, a filter, a negative feedback circuit, and a positive feedback circuit. The amplifier is configured to amplify a difference between a reference signal and a first feedback signal to generate a first signal. The comparator is configured to compare a second feedback signal with the first signal to generate a second signal. The switch driver is configured to generate a first switching signal and a second switching signal in response to the second signal. The power switch is configured to transfer an input signal to a first output node in response to the first switching signal and the second switching signal, and generates a pulse width modulated signal of which a pulse width and a frequency are varied, wherein the pulse width modulated signal is provided to the first output node. The filter is configured to generate a direct current output voltage signal in response to the pulse width modulated signal, wherein the direct current output voltage signal is provided to a second output node. The negative feedback circuit is configured to generate the first feedback signal in response to the direct current output voltage signal. The positive feedback circuit is configured to generate the second feedback signal oscillated in response to the pulse width modulated signal.

In an exemplary embodiment of the present invention, a DC-DC converter includes an amplifier, an anti-overlap circuit, a switch driver, a power switch, a filter, a negative feedback circuit, and a positive feedback circuit. The amplifier is configured to amplify a difference between a reference signal and a first feedback signal to generate a first signal. The comparator is configured to compare a second feedback signal with the first signal to generate a second signal. The anti-overlap circuit is configured to generate a first pulse signal and a second pulse signal in response to the second signal, the second pulse signal having a second pulse width wider than a first pulse width of the first pulse signal. The switch driver is configured to generate a first switching signal and a second switching signal in response to the first pulse signal and the second pulse signal. The power switch is configured to transfer an input signal to a first output node in response to the first switching signal and the second switching signal and is configured to generate a pulse width modulated signal of which a pulse width and a frequency are varied, wherein the pulse width modulated signal is provided to the first output node. The filter is configured to generate a direct current output voltage signal in response to the pulse width modulated signal, wherein the direct current output voltage signal is provided to a second output node. The negative feedback circuit is configured to generate the first feedback signal in response to the direct current output voltage signal. The positive feedback circuit is configured to generate the second feedback signal oscillated in response to the pulse width modulated signal.

In an exemplary embodiment of the present invention, a method of modulating a pulse width includes: positively feeding back a pulse width modulated signal to generate an oscillated signal; negatively feeding back a direct current output signal; amplifying a difference between the negatively fed-back direct current output signal and a reference signal to output a first signal; comparing the first signal with the oscillated signal to generate a first switching signal and a second switching signal; amplifying a difference between the negatively fed-back direct current output signal and the reference signal, comparing the oscillated signal with the reference signal and generating the first switching signal and the second switching signal, wherein the direct current output signal follows the reference signal; transferring an input signal to a first output node in response to the first switching signal and the second switching signal to generate a pulse width modulated signal of which a pulse width and a frequency are varied at the first output node; and generating a direct current output voltage signal at a second output node in response to the pulse width modulated signal.

BRIEF DESCRIPTION OF THE DRAWINGS

The present invention will become more apparent to those of ordinary skill in the art when descriptions of exemplary embodiments thereof are read with reference to the accompanying drawings.

DETAILED DESCRIPTION OF EXEMPLARY EMBODIMENTS

Figure 1:
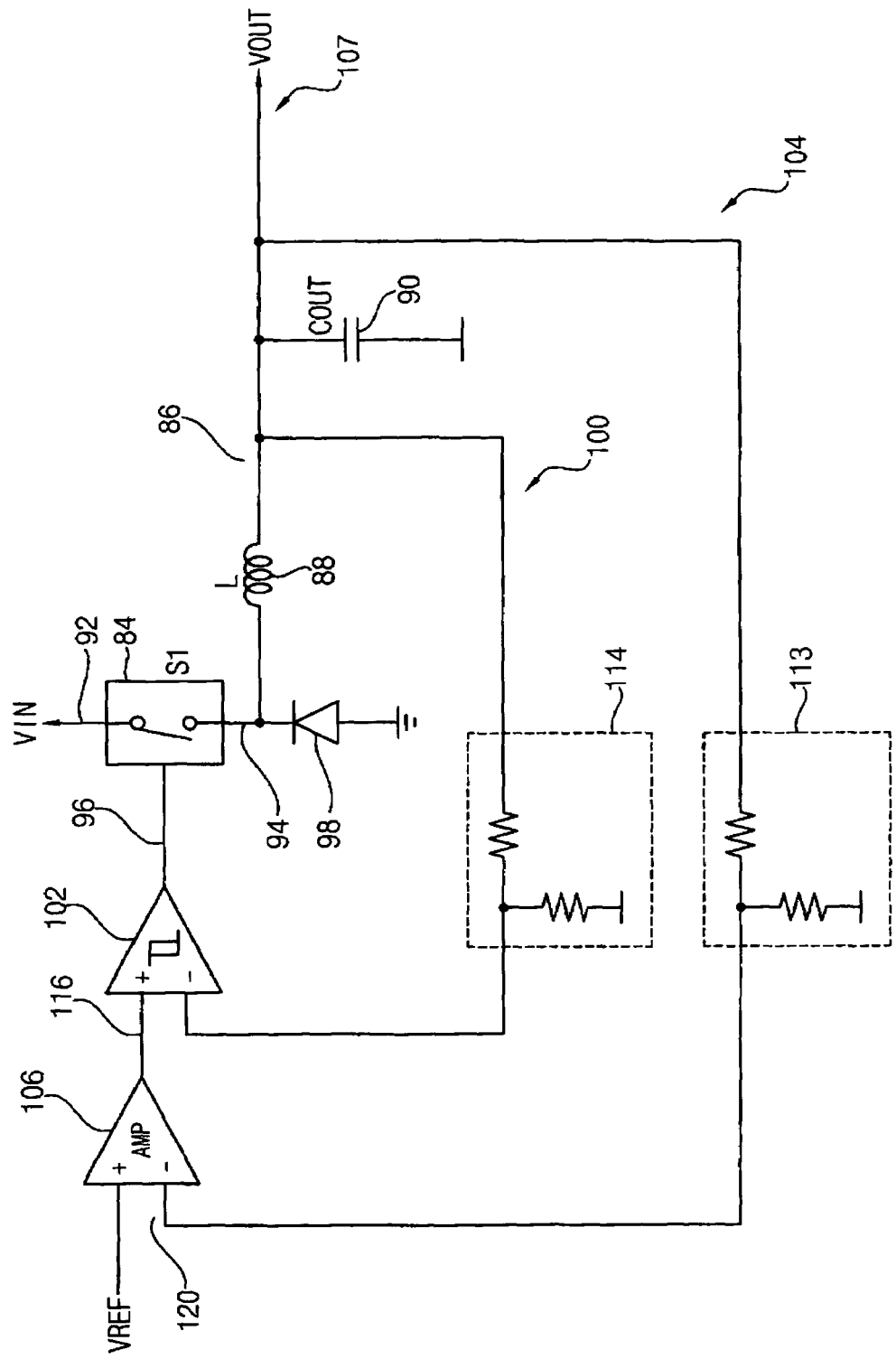
FIG. 1 is a circuit diagram illustrating a conventional DC-DC converter having dual feedback loops.

Hereinafter, exemplary embodiments of the present invention will be described in detail with reference to the accompanying drawings. Like reference numerals refer to similar or identical elements throughout the description of the figures.

It will be understood that, although the terms first, second, etc. may be used herein to describe various elements, components, regions, layers and/or sections, these elements, components, regions, layers and/or sections, should not be limited by these terms. These terms are used to distinguish one element, component, region, layer or section from another element, component, region, layer or section. For example, a first element could be termed a second element. As used herein, the term "and/or" includes any and all combinations of one or more of the associated listed items.

It will be understood that when an element is referred to as being "connected" or "coupled" to another element, it can be directly connected or coupled to the other element or intervening elements may be present. Other words used to describe the relationship between elements should be interpreted in a like fashion (e.g., "between" versus "directly between", "adjacent" versus "directly adjacent", etc.).

Figure 2A:
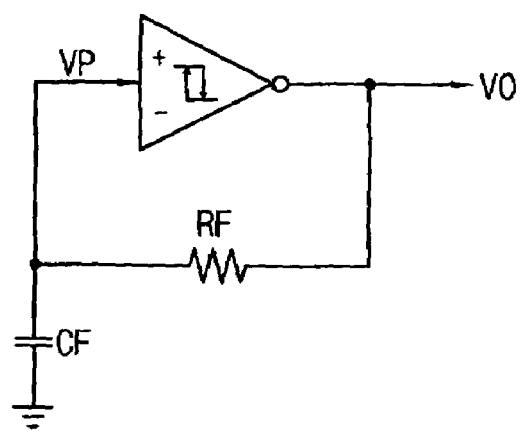
FIG. 2A is a schematic circuit diagram illustrating a Schmitt trigger circuit.
Figure 2B:
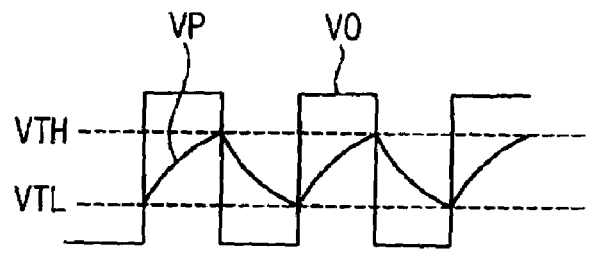
FIG. 2B is a waveform diagram illustrating waveforms of signals associated with the Schmitt trigger circuit shown in FIG. 2A.

FIG. 2A is a schematic circuit diagram illustrating a Schmitt trigger circuit. FIG. 2B is a waveform diagram illustrating waveforms of signals associated with the Schmitt trigger circuit shown in FIG. 2A. Referring to FIG. 2A, the Schmitt trigger circuit has a hysteresis characteristic and includes a feedback circuit RF and a capacitor CF.

As shown in FIG. 2B, an input signal VP of the Schmitt trigger circuit exhibits a sawtooth waveform or a triangle waveform, and an output signal VO exhibits a pulse waveform. Additionally, the Schmitt trigger circuit has a high threshold voltage VTH and a low threshold voltage VTL. The high threshold voltage VTH may be defined as an upper limit that the input signal VP can reach when the output signal VO transitions from a logic 'low' state to a logic 'high' state. The low threshold voltage VTL may be defined as a lower limit that the input is signal VP can reach when the output signal VO transitions from the logic 'high' state to the logic 'low' state.

Figure 3:
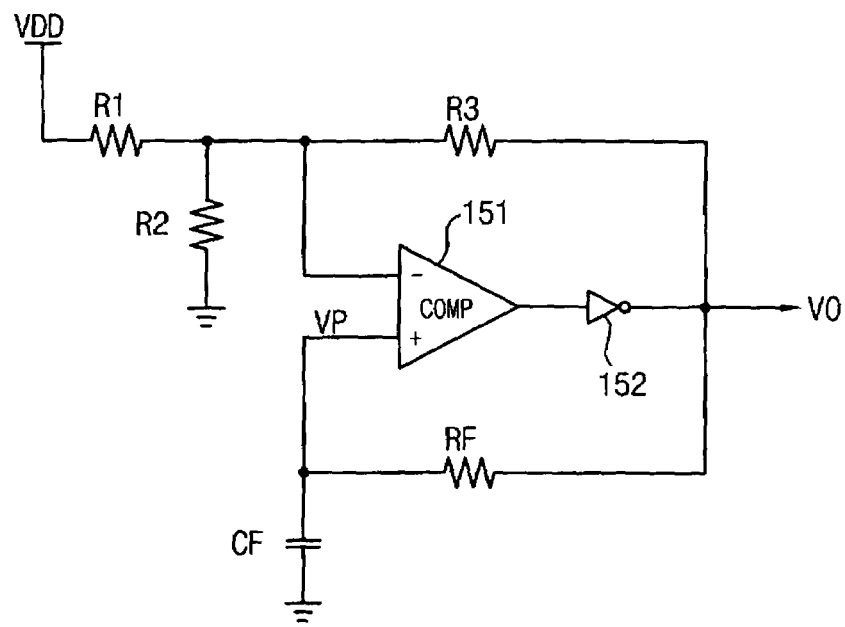
FIG. 3 is a detailed circuit diagram illustrating the Schmitt trigger circuit shown in FIG. 2A.

FIG. 3 is a detailed circuit diagram illustrating the Schmitt trigger circuit shown in FIG. 2A. Referring to FIG. 3, the Schmitt trigger circuit includes a comparator 151, an inverter 152, resistors R1, R2 and R3, a feedback circuit RF and a capacitor CF.

A high threshold voltage VTH and a low threshold voltage VTL may be expressed by the following equations 1 and 2.

$$VTL = \frac{R2}{(R1\|R3) + R2} \times VDD \quad \text{[Equation 1]}$$

where "R1∥R3" denotes the sum of the resistances of parallel resistors R1 and R3.

$$VTH = \frac{(R2\|R3)}{R1 + (R2\|R3)} \times VDD \quad \text{[Equation 2]}$$

where "R2∥R3" denotes the sum of the resistances of parallel resistors R2 and R3.

An oscillated frequency "fo" of the Schmitt trigger circuit shown in FIG. 3 may be expressed by the following equation 3.

$$fo = \frac{1}{RF \times CF \times \left(\frac{VTH}{VTL} \times \frac{VDD - VTL}{VDD - VTH}\right)} \quad \text{[Equation 3]}$$

Figure 4A:
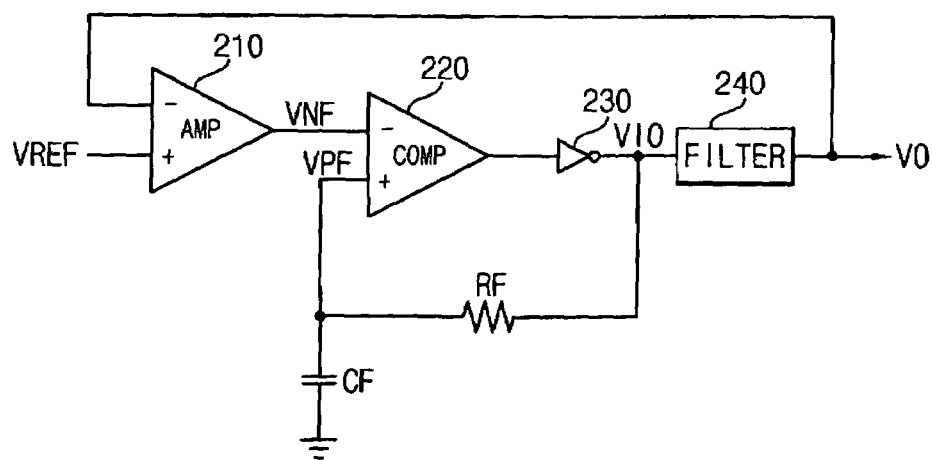
FIG. 4A is a circuit diagram illustrating a modified Schmitt trigger circuit according to an exemplary embodiment of the present invention.
Figure 4B:
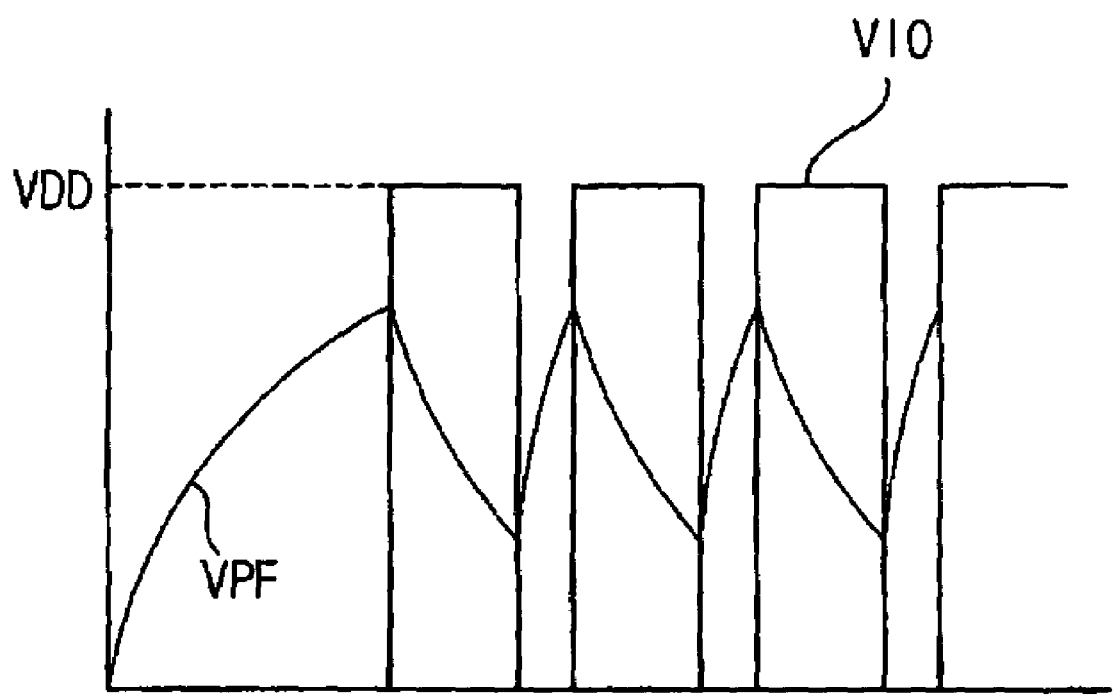
FIG. 4B is a waveform diagram illustrating waveforms of signals associated with the modified Schmitt trigger circuit shown in FIG. 4A.

FIG. 4A is a circuit diagram illustrating a modified Schmitt trigger circuit according to an exemplary embodiment of the present invention. FIG. 4B is a waveform diagram illustrating waveforms of signals associated with the modified Schmitt trigger circuit shown in FIG. 4A.

Referring to FIG. 4A, the modified Schmitt trigger circuit includes an operational amplifier 210, a comparator 220, an inverter 230, a filter 240, a resistor RF and a capacitor CF. The operational amplifier 210 amplifies a voltage difference between an output signal VO of the modified Schmitt trigger circuit and a reference signal VREF. The comparator 220 compares an output signal VNF of the operational amplifier 210 with a feedback signal VPF to generate a pulse signal. The inverter 230 inverts an output signal of the comparator 220 and improves current drive capability. The filter 240 rectifies an output signal VIO, of the inverter 230, which has a pulse waveform to convert the rectified output signal to a direct current voltage signal VO. For example, the filter 240 may be implemented using an inductor and a capacitor.

Referring to FIG. 4B, the output signal VIO of the inverter 230 exhibits a pulse waveform, and the feedback signal VPF exhibits a sawtooth waveform.

Referring again to FIG. 4A, when a voltage level of the direct current voltage signal VO is higher than that of the reference signal VREF, the output signal VNF of the operational amplifier 210 may be equal to a low power voltage provided to the operational amplifier 210; for example, the output signal VNF may be equal to about 0 volts. When the voltage level of the direct current voltage signal VO is lower than that of the reference signal VREF, the output signal VNF of the operational amplifier 210 may be equal to a high power voltage VDD provided to the operational amplifier 210; for example, the output signal VNF may be equal to VDD.

As described above, the modified Schmitt trigger circuit shown in FIG. 4A rectifies the output signal VIO of the inverter 230 to generate the direct current voltage signal VO, and feeds back the direct current voltage signal VO to an inverting input terminal of the operational amplifier 210 to compare the fed-back direct current voltage signal VO with the reference signal VREF. The output signal VNF of the operational amplifier 210 may have a 'high' level or a 'low' level.

The modified Schmitt trigger circuit shown in FIG. 4A operates like a Schmitt trigger circuit using two threshold voltages. The low threshold voltage VTL and the high threshold voltage VTH are varied based on a magnitude of the reference signal VREF. The output signal VIO of the inverter 230 has a duty cycle (or a duty ratio) and a frequency varied in response to the reference signal VREF. The modified Schmitt trigger circuit shown in FIG. 4A operates so that a voltage level of the direct current voltage signal VO becomes equal to that of the reference signal VREF.

Figure 5:
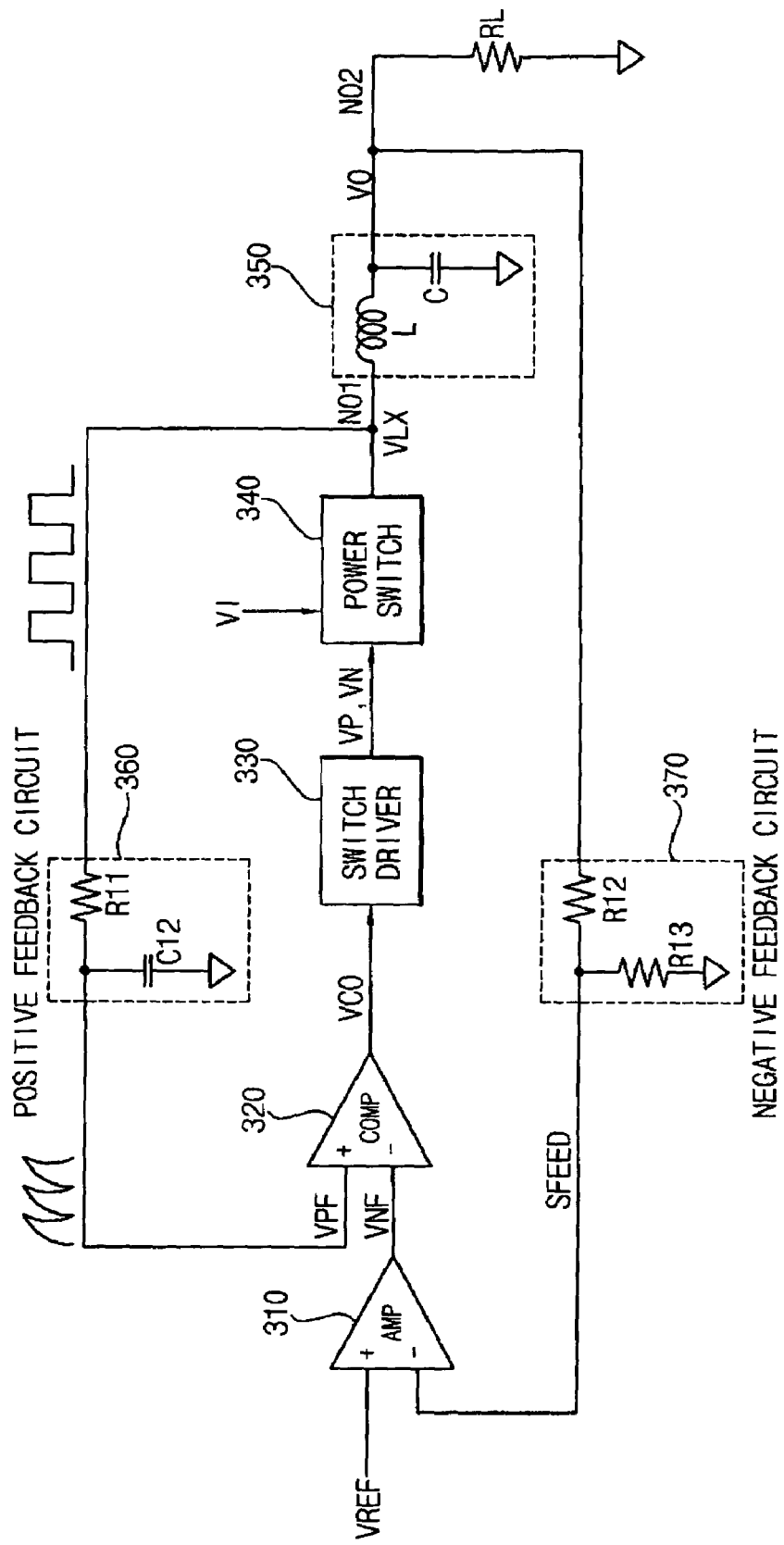
FIG. 5 is a circuit diagram illustrating a DC-DC converter employing a modified Schmitt trigger circuit according to an exemplary embodiment of the present invention.

FIG. 5 is a circuit diagram illustrating a DC-DC converter employing a modified Schmitt trigger circuit according to an exemplary embodiment of the present invention. Referring to FIG. 5, the DC-DC converter includes an operational amplifier 310, a comparator 320, a switch driver 330, a power switch 340, a filter 350, a negative feedback circuit 370 and a positive feedback circuit 360.

The operational amplifier 310 amplifies a voltage difference between a reference signal VREF and a first feedback signal SFEED to generate a first signal VNF. The comparator 320 compares a second feedback signal VPF with the first signal VNF to generate a second signal VCO. The switch driver 330 generates a first switching signal VP and a second switching signal VN in response to the second signal VCO.

The power switch 340 transfers an input signal VI to a first output node NO1 in response to the first switching signal VP and the second switching signal VN, to generate a pulse width modulated signal VLX of which a pulse width and a frequency are varied at the first output node NO1. The filter 350 generates a direct current output voltage signal VO at a second output node NO2 in response to the pulse width modulated signal VLX. The negative feedback circuit 370 generates the first feedback signal SFEED in response to the direct current output voltage signal VO. The positive feedback circuit 360 generates the second feedback signal VPF oscillated in response to the pulse width modulated signal VLX.

The negative feedback circuit 370 may include a first resistor R12 and a second resistor R13. A first terminal of the first resistor R12 is coupled to the second output node NO2, and a second terminal of the first resistor R12 is coupled to an inverting input terminal of the operational amplifier 310.

The positive feedback circuit 360 may include a resistor R11 and a capacitor C12. A first terminal of the first resistor R11 is coupled to the first output node NO1, and a second terminal of the first resistor R11 is coupled to a non-inverting input terminal of the comparator 320. The capacitor C12 is coupled between the second terminal of the resistor R11 and ground.

The DC-DC converter shown in FIG. 5 positively feeds back the pulse width modulated signal VLX to the positive feedback circuit 360 to generate the second feedback signal VPF. Additionally, the DC-DC converter shown in FIG. 5 negatively feeds back the direct current output voltage signal VO to the negative feedback circuit 370 to compare the first feedback signal SFEED with the reference signal VREF, and then generates the switching signals VP and VN so that the direct current output voltage signal VO follows the reference signal VREF.

Figure 6:
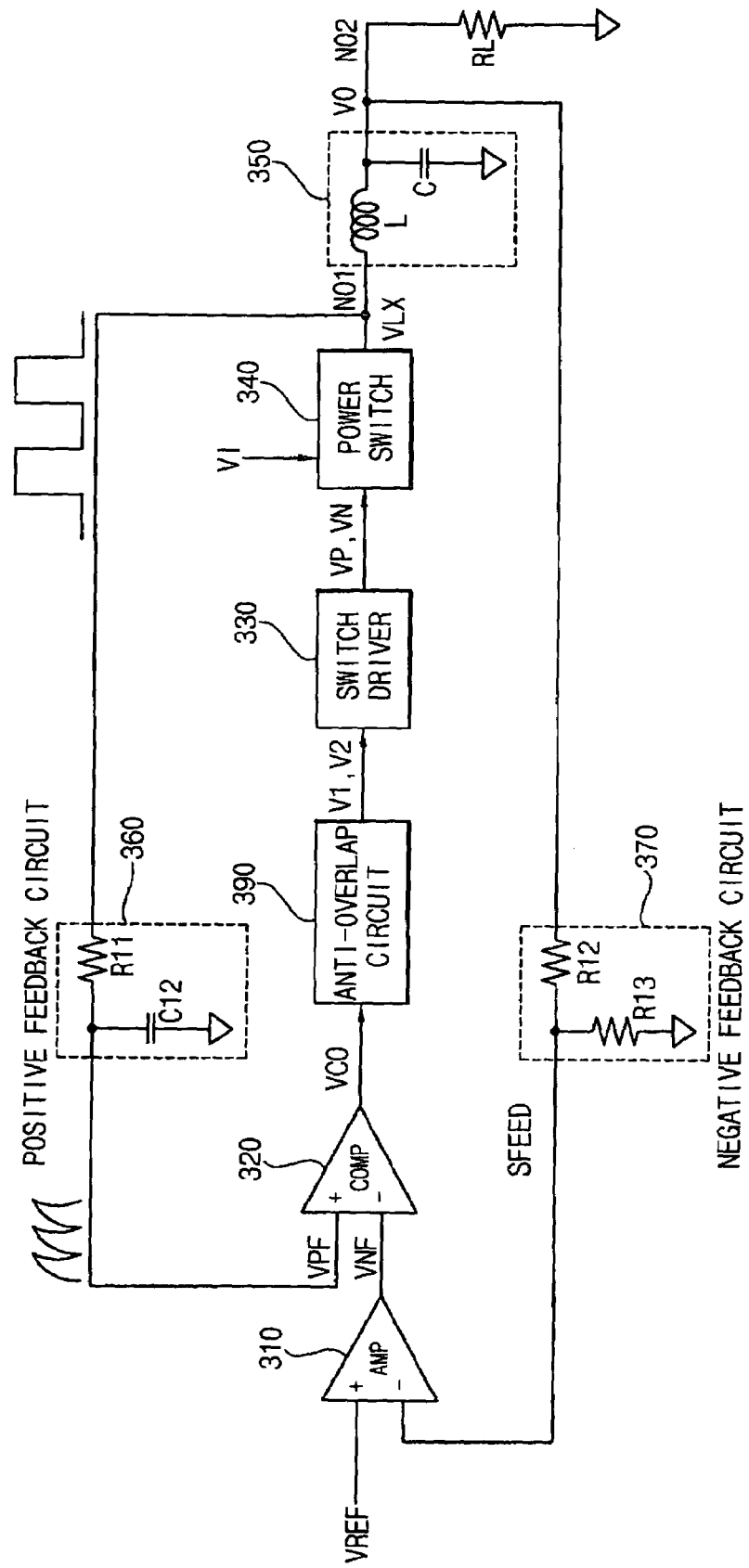
FIG. 6 is a circuit diagram illustrating a DC-DC converter employing a modified Schmitt trigger circuit according to another exemplary embodiment of the present invention.

FIG. 6 is a circuit diagram illustrating a DC-DC converter employing a modified Schmitt trigger circuit according to another exemplary embodiment of the present invention. The DC-DC converter shown in FIG. 6 includes an anti-overlap circuit 390, which is not included in the DC-DC converter shown in FIG. 5.

Referring to FIG. 6, the DC-DC converter includes an operational amplifier 310, a comparator 320, the anti-overlap circuit 390, a switch driver 330, a power switch 340, a filter 350, a negative feedback circuit 370 and a positive feedback circuit 360.

The operational amplifier 310 amplifies a voltage difference between a reference signal VREF and a first feedback signal SFEED to generate a first signal VNF. The comparator 320 compares a second feedback signal VPF with the first signal VNF to generate a second signal VCO. The anti-overlap circuit 390 generates a first pulse signal V1 in response to the second signal VCO. Additionally, the anti-overlap circuit 390 generates a second pulse signal V2 having a pulse width wider than that of the first pulse signal V1. In an exemplary embodiment of the present invention, the second pulse signal V2 has high levels and low levels identical with those of the first pulse signal V1 over the same time intervals.

The switch driver 330 generates a first switching signal VP and a second switching signal VN in response to the first pulse signal V1 and the second pulse signal V2. The power switch 340, which transfers an input signal VI to a first output node NO1 in response to the first switching signal VP and the second switching signal VN, generates a pulse width modulated signal VLX of which a pulse width and a frequency are varied at the first output node NO1. The filter 350 generates a direct current output voltage signal VO at a second output node NO2 in response to the pulse width modulated signal VLX.

The negative feedback circuit 370 generates the first feedback signal SFEED in response to the direct current output voltage signal VO. The positive feedback circuit 360 generates the second feedback signal VPF oscillated in response to the pulse width modulated signal VLX.

Figure 7:
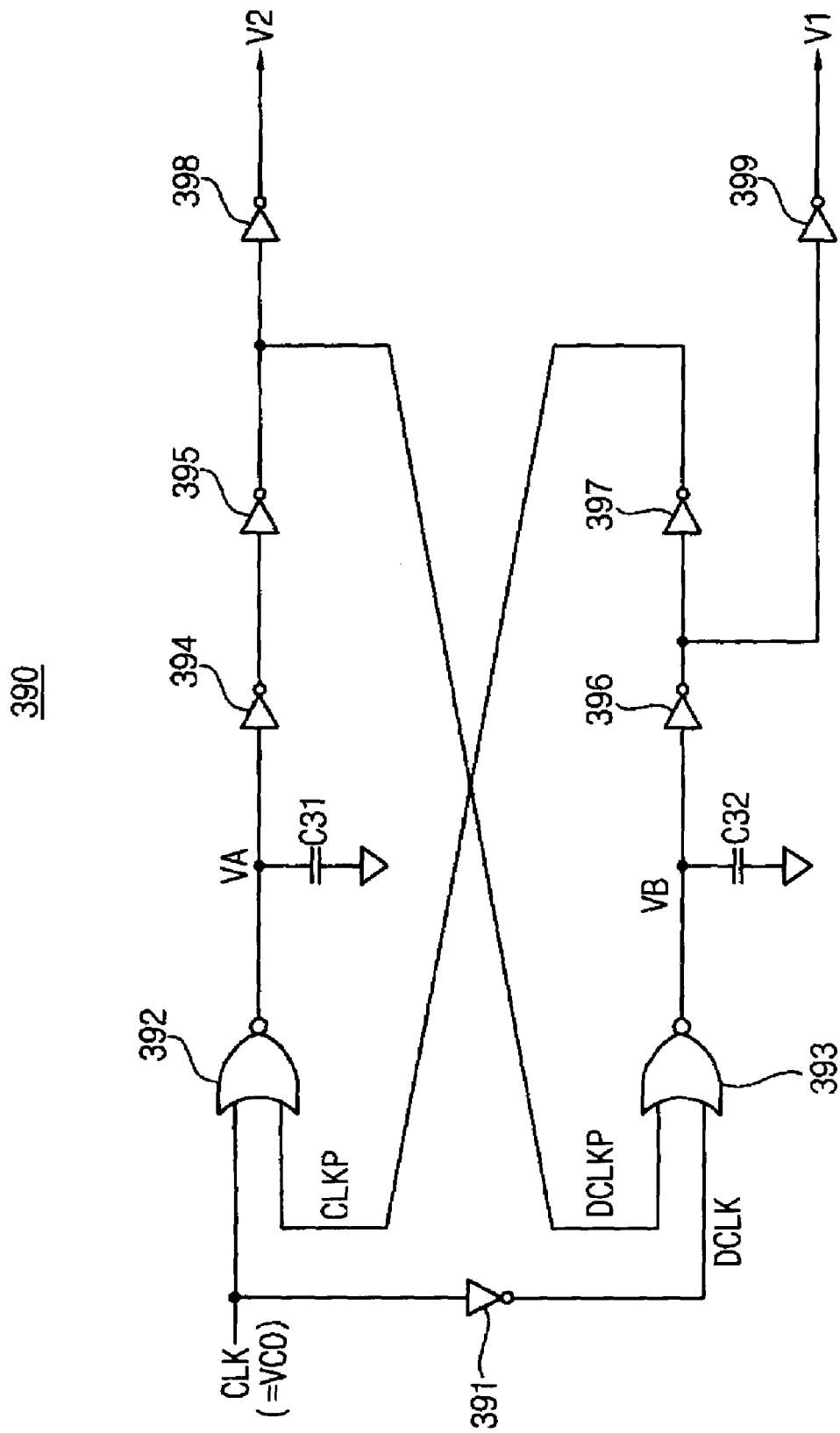
FIG. 7 is a circuit diagram illustrating an anti-overlap circuit included in the DC-DC converter shown in FIG. 6 according to an exemplary embodiment of the present invention.

FIG. 7 is a circuit diagram illustrating an anti-overlap circuit included in the DC-DC converter shown in FIG. 6 according to an exemplary embodiment of the present invention. Referring to FIG. 7, the anti-overlap circuit 390 includes a first NOR gate 392 and a second NOR gate 393, a first inverter 391 through a seventh inverter 399, and a first capacitor C31 and a second capacitor C32.

The first inverter 391 inverts a clock signal CLK, such as the second signal VCO of FIG. 6. The first NOR gate 392 performs a logical NOR operation on the second signal VCO and a third signal CLKP. The first capacitor C31 is coupled to an output terminal of the first NOR gate 392. The second inverter 394 inverts an output signal VA of the first NOR gate 392. The third inverter 395 inverts an output signal of the second inverter 394 to generate a fourth signal DCLKP. The fourth inverter 398 inverts an output signal of the third inverter 395 to generate a second pulse signal V2. The second NOR gate 393 performs a logical NOR operation on the output signal DCLK of the first inverter 391 and the fourth signal DCLKP. The second capacitor C32 is coupled to an output terminal of the second NOR gate 393. The fifth inverter 396 inverts an output signal VB of the second NOR gate 393. The sixth inverter 397 inverts an output signal of the fifth inverter 396 to generate the third signal CLKP. The seventh inverter 399 inverts an output signal of the fifth inverter 396 to generate a first pulse signal V1.

Figure 8:
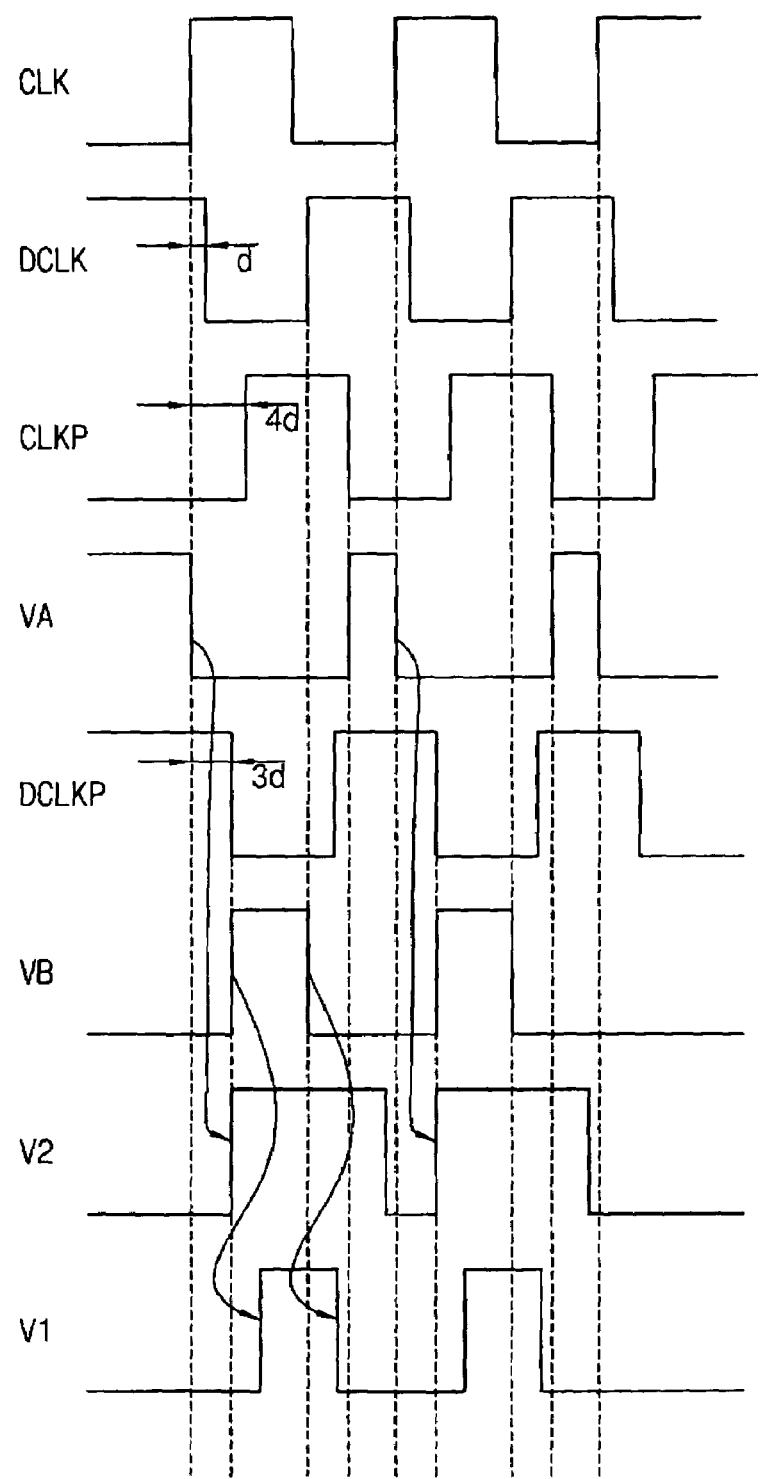
FIG. 8 is a timing diagram illustrating signals associated with the anti-overlap circuit shown in FIG. 7.

FIG. 8 is a timing diagram illustrating signals associated with the anti-overlap circuit shown in FIG. 7. In the timing diagram shown in FIG. 8, a time period delayed by the inverters and the NOR gates shown in FIG. 7 is assumed as 'd', and a delayed time due to the capacitors C31 and C32 is not considered.

Referring to FIG. 8, the second pulse signal V2 has a pulse width wider than that of the first pulse signal V1, and a time region where the second pulse signal V2 is at a logic 'high' level and the first pulse signal V1 is at a logic 'low' level, exists at each pulse. During the time region, a P-type switch (not shown) and an N-type switch (not shown) comprising the power switch 340 shown in FIG. 6 are turned off.

Such a dead time of a switching operation is required for preventing flow of a large current in a case where the P-type switch (not shown) and the N-type switch (not shown), comprising the power switch 340 shown in FIG. 6, are both turned on. When the delayed time due to the capacitors C31 and C32 shown in FIG. 7 is considered, an entire delayed time period is determined by the capacitors C31 and C32 rather than the inverters 391, 394 through 399 and the gates 392 and 393.

Figure 9A:
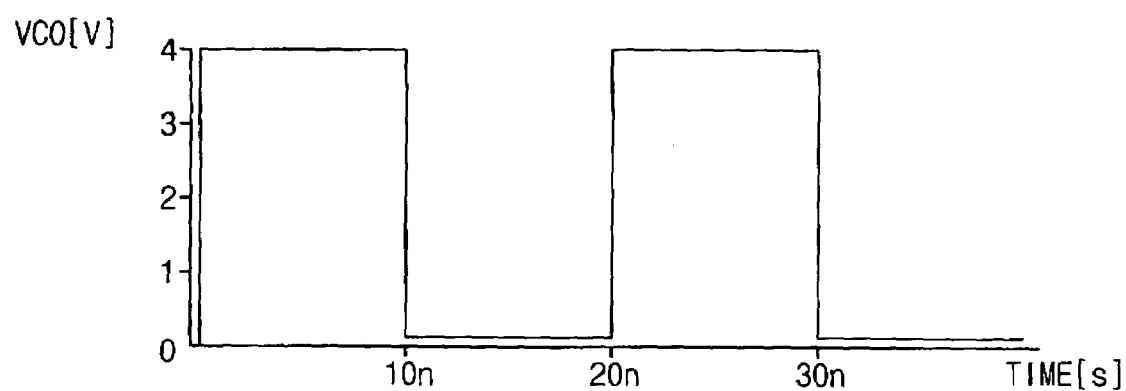
FIGS. 9A and 9B are waveform diagrams illustrating simulation results of the anti-overlap circuit shown in FIG. 7.
Figure 9B:
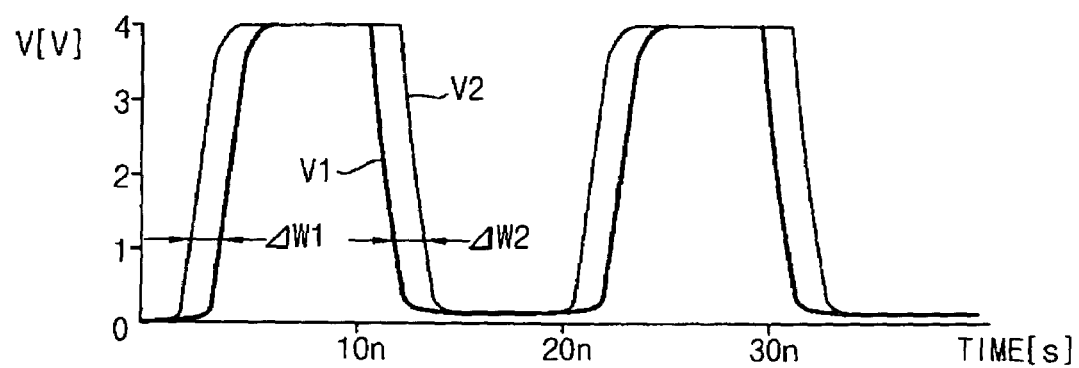

FIGS. 9A and 9B are waveform diagrams illustrating simulation results of the anti-overlap circuit 390 shown in FIG. 7. For the simulation, a capacitor having a capacitance of about 0.1 pF is used for the capacitors C31 and C32.

FIG. 9A is a waveform diagram illustrating a waveform of the output signal VCO of the comparator 320 shown in FIG. 6, and FIG. 9B is a waveform diagram illustrating waveforms of the first pulse signal V1 and the second pulse signal V2 outputted from the anti-overlap circuit 390.

As shown in FIG. 9B, the second pulse signal V2 encloses the first pulse signal V1, and a time region where the second pulse signal V2 is at the logic 'high' level and the first pulse signal V1 is at the logic 'low' level exists at each pulse. Additionally, a pulse width of the second pulse signal V2 is larger than that of the first pulse signal V1 by as much as $\Delta W1$ in a left direction, and is larger than that of the first pulse signal V1 by as much as $\Delta W2$ in a right direction.

Figure 10:
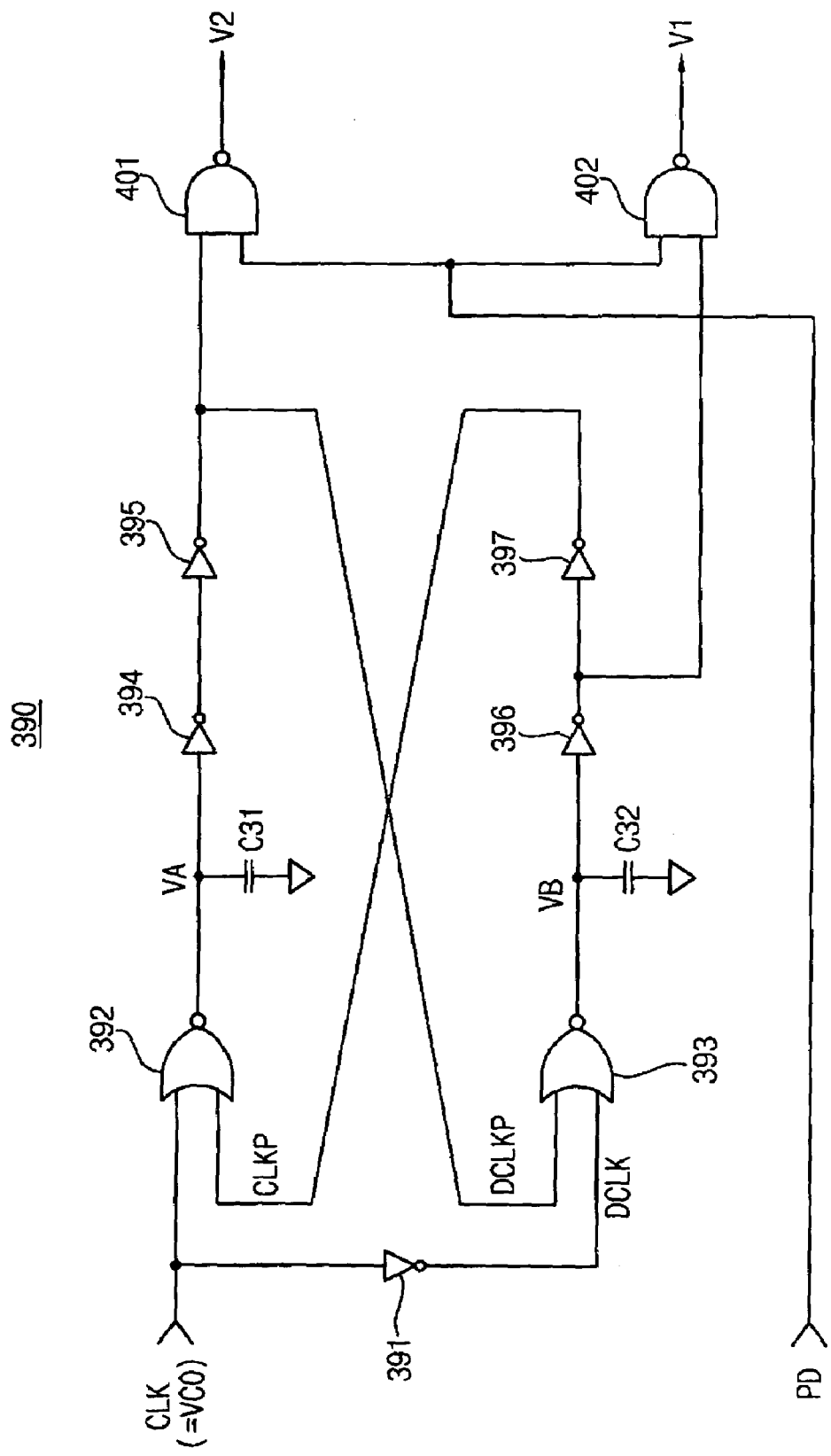
FIG. 10 is a circuit diagram illustrating an anti-overlap circuit included in the DC-DC converter shown in FIG. 6 according to another exemplary embodiment of the present invention.

FIG. 10 is a circuit diagram illustrating an anti-overlap circuit 390 included in the DC-DC converter shown in FIG. 6 according to another exemplary embodiment of the present invention. The anti-overlap circuit 390 shown in FIG. 10 further includes a power down function compared with the anti-overlap circuit 390 shown in FIG. 7.

Referring to FIG. 10, the anti-overlap circuit 390 includes a first NOR gate 392 and a second NOR gate 393, a first inverter 391 through a fifth inverter 397, a first NAND gate 401, a second NAND gate 402, a first capacitor C31 and a second capacitor C32.

The first inverter 391 inverts a clock signal CLK, i.e., the second signal VCO shown in FIG. 6. The first NOR gate performs a logical NOR operation on the second signal VCO and a third signal CLKP. The first capacitor C31 is coupled to an output terminal of the first NOR gate 392. The second inverter 394 inverts an output signal VA of the first NOR gate 392. The third inverter 395 inverts an output signal of the second inverter 394 to generate a fourth signal DCLKP. The first NAND gate 401 performs a logical NAND operation on the output signal DCLKP of the third inverter 395 and a power down signal PD to generate a second pulse signal V2. The second NOR gate 393 performs a logical NOR operation on the output signal DCLK of the first inverter 391 and the fourth signal DCLKP. The second capacitor C32 is coupled to an output terminal of the second NOR gate 393. The fourth inverter 396 inverts an output signal VB of the second NOR gate 393. The fifth inverter 397 inverts an output signal of the fourth inverter 396 to generate a third signal CLKP. The second NAND gate 402 performs a logical NAND operation on an output signal of the fourth inverter 396 and the power down signal to generate a first pulse signal V1.

The anti-overlap circuit 390 shown in FIG. 10 includes two NAND gates 401 and 402 instead of the inverters 398 and 399 of the anti-overlap circuit 390 shown in FIG. 7, and the power down signal PD is applied to an input terminal of each of the NAND gates 401 and 402. Hereinafter, operations of the anti-overlap circuit 390 shown in FIG. 10 will be explained.

When the power down signal PD is at a logic 'low' level, the pulse signals V1 and V2 outputted from the NAND gates 401 and 402 become the logic 'high' level. As a result, the switching signals VP and VN outputted from the switch driver 330 shown in FIG. 6 become the logic 'high' level, and the P-type switch comprising the power switch 340 shown in FIG. 6 is turned off and the N-type switch comprising the power switch 340 shown in FIG. 6 is turned on; thus, the first output node NO1 becomes the logic 'low' level. The power switch 340 according to an exemplary embodiment of the present invention is illustrated in FIG. 13.

Figure 11A:
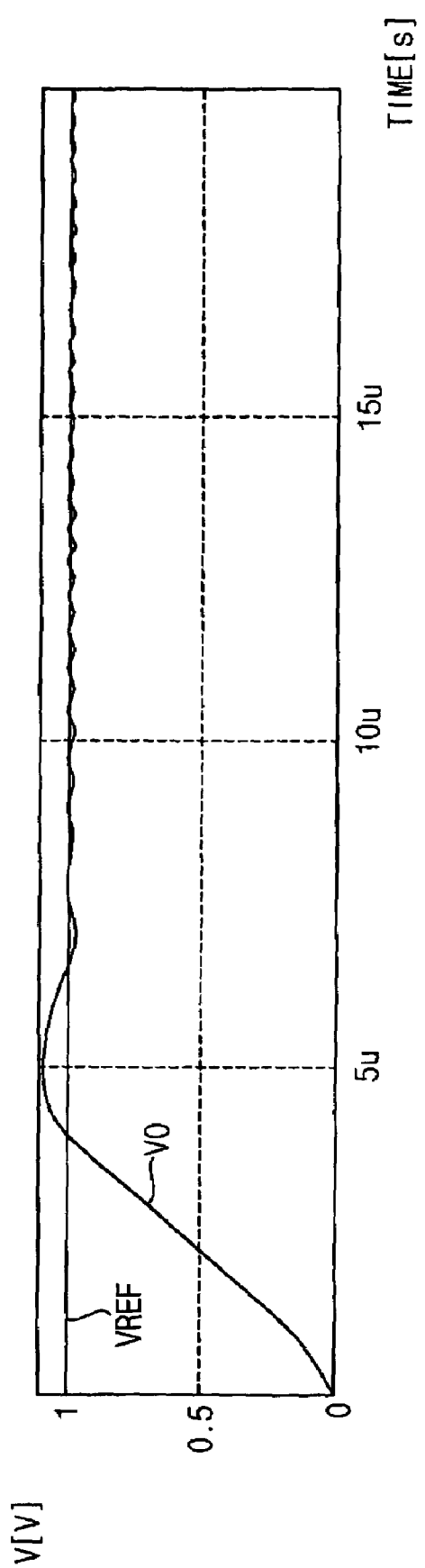
FIGS. 11A through 11C are waveform diagrams illustrating simulation results of the DC-DC converter shown in FIG. 6 in a case where a reference voltage is equal to about 1 volt.
Figure 11B:
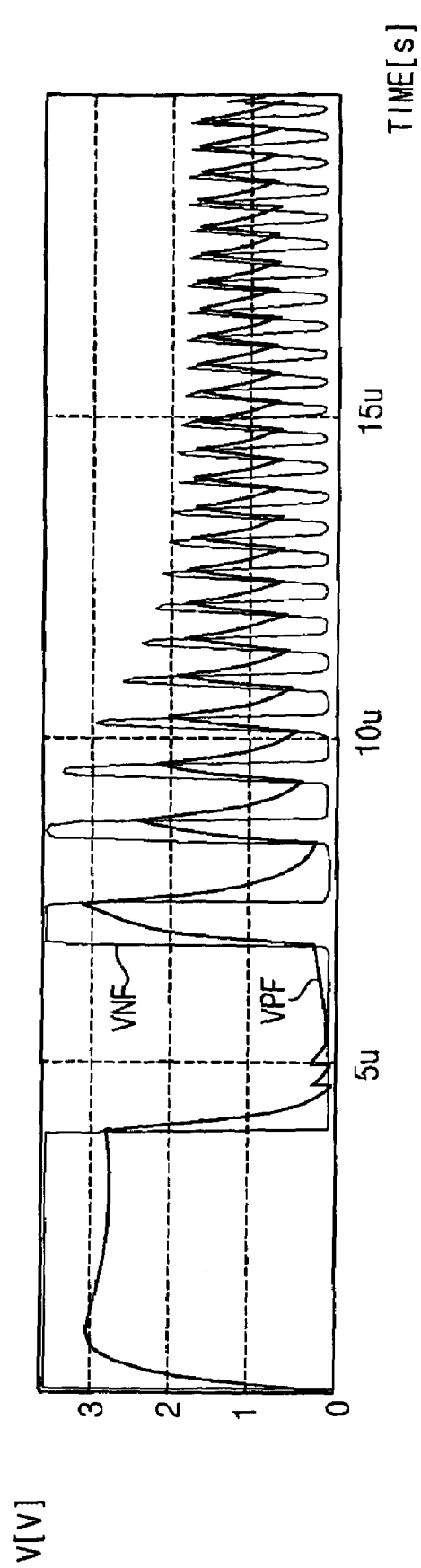
Figure 11C:
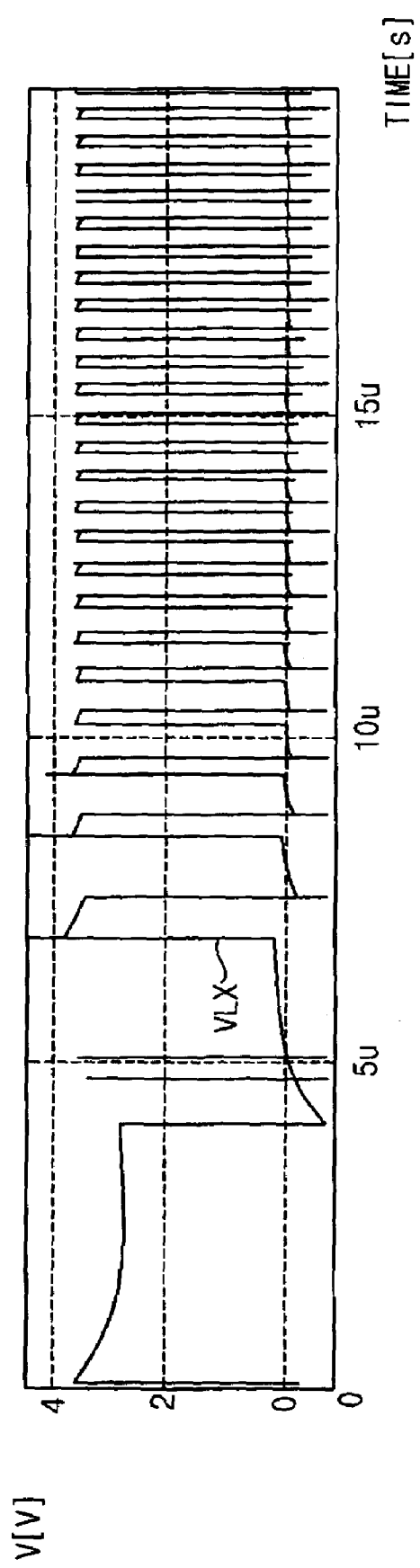

FIGS. 11A through 11C are waveform diagrams illustrating simulation results of the DC-DC converter shown in FIG. 6 in a case where a reference voltage is equal to about 1 volt. Referring to FIG. 11A, a direct current output voltage signal VO outputted from a DC-DC converter follows a reference signal VREF having a direct voltage of about 1 volt. Referring to FIGS. 11B and 11C, the second feedback signal VPF applied to a non-inverting input terminal of a comparator 320 has a sawtooth waveform, and the pulse width modulated signal VLX outputted at the first output node NO1 has a variable pulse width and frequency.

Figure 12A:
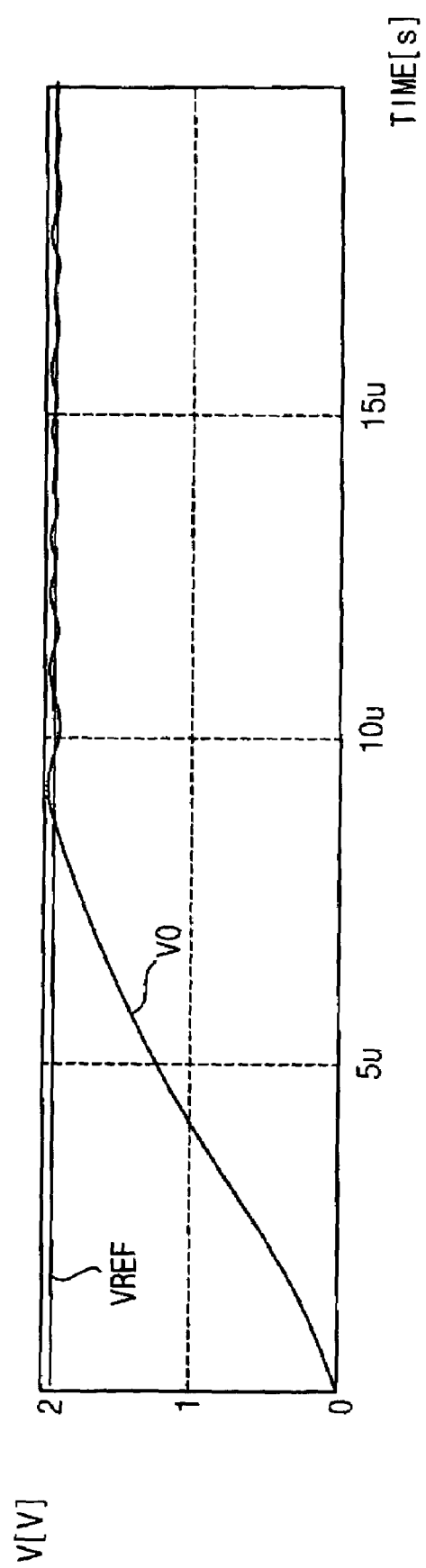
FIGS. 12A through 12C are waveform diagrams illustrating simulation results of the DC-DC converter shown in FIG. 6 in a case where a reference voltage is equal to about 2 volts.
Figure 12B:
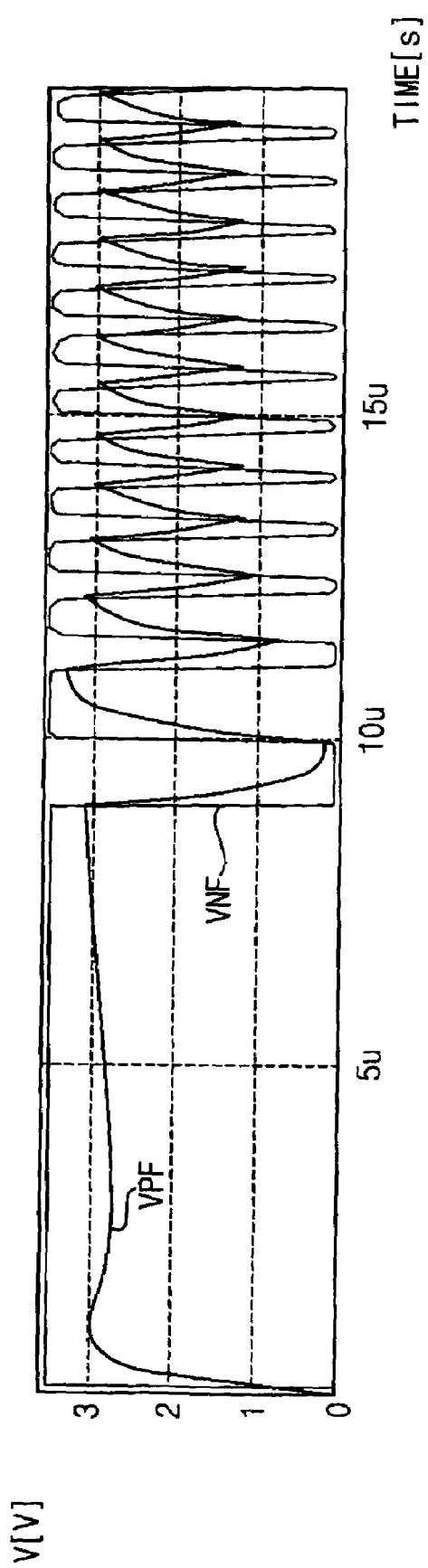
Figure 12C:
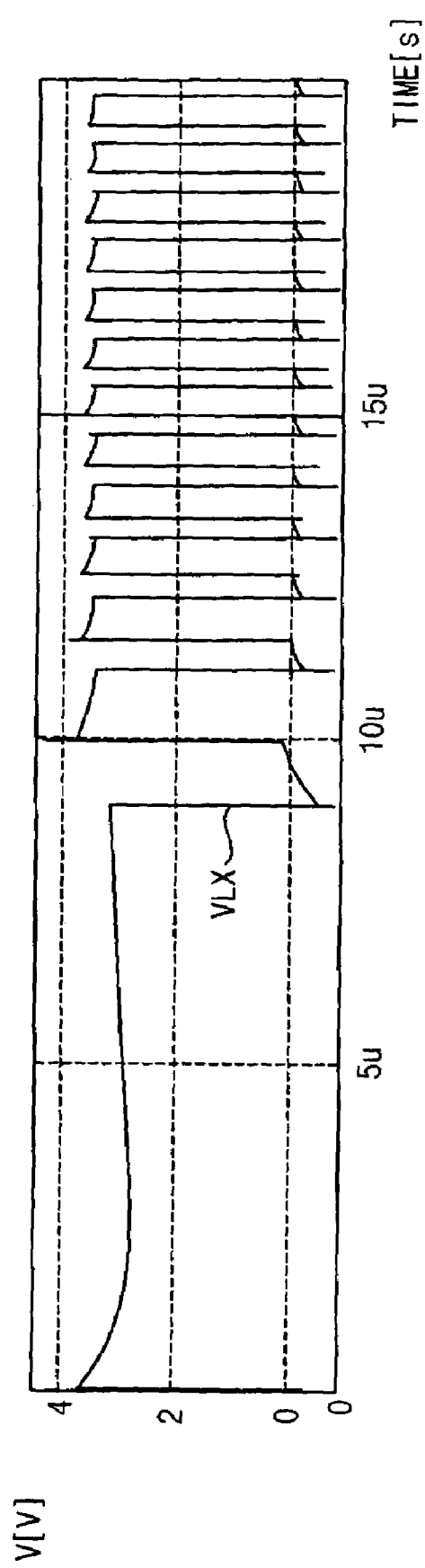

FIGS. 12A through 12C are waveform diagrams illustrating simulation results of the DC-DC converter shown in FIG. 6 in a case where a reference voltage is equal to about 2 volts. Referring to FIG. 12A, a direct current output voltage signal VO outputted from a DC-DC converter follows a reference signal VREF having a direct voltage of about 2 volts. Referring to FIGS. 12B and 12C, the second feedback signal VPF applied to a non-inverting input terminal of the comparator 320 exhibits a sawtooth waveform, and the pulse width modulated signal VLX outputted at the first output node NO1 has a variable pulse width and frequency. A duty cycle (or a duty ratio) of the pulse width modulated signal VLX shown in FIG. 12C is larger than that of the pulse width modulated signal VLX shown in FIG. 11C, since the reference voltage VREF applied to the DC-DC converter shown in FIG. 12C is larger than that applied to the DC-DC converter shown in FIG. 11C.

Figure 13:
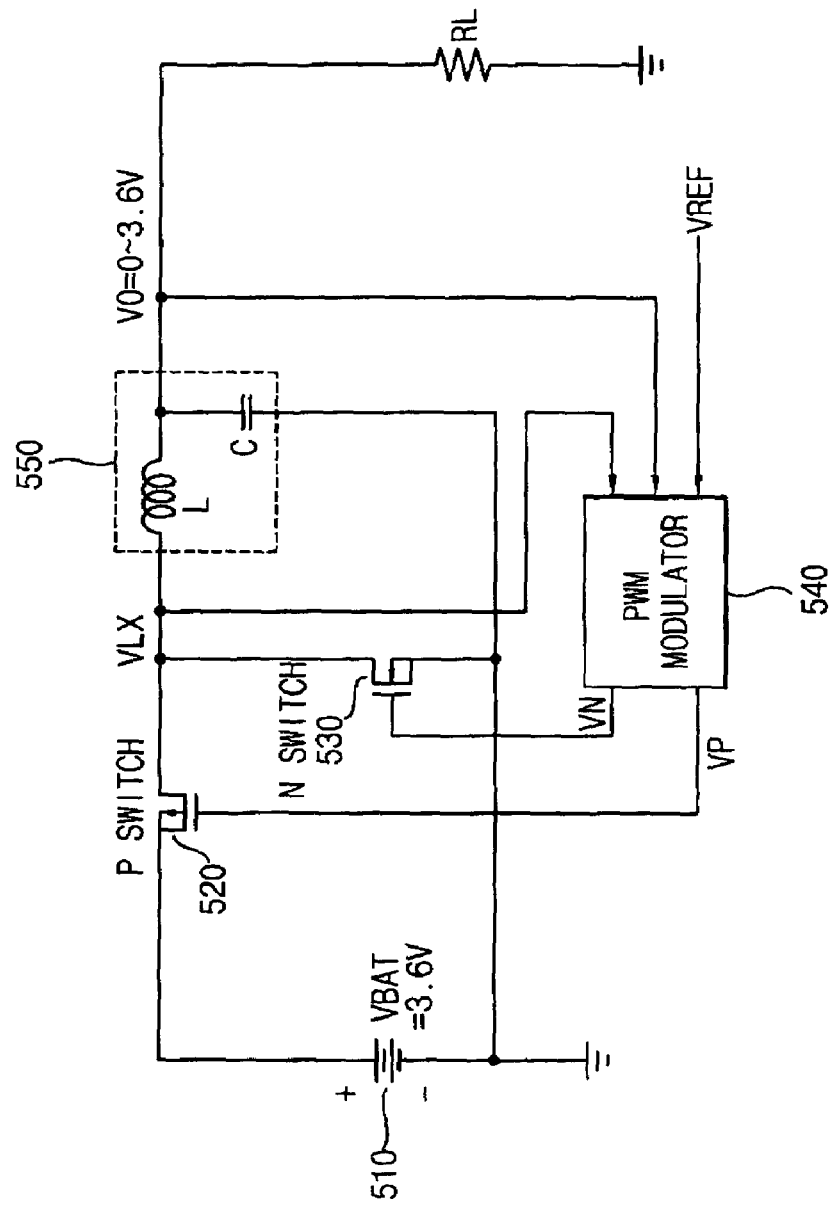
FIG. 13 is a schematic circuit diagram illustrating a system employing a DC-DC converter according to an exemplary embodiment of the present invention, which generates an output voltage of about 0 volts through about 3.6 volts.

FIG. 13 is a schematic circuit diagram illustrating a system employing a DC-DC converter according to an exemplary embodiment of the present invention, which generates an output voltage of about 0 volts through about 3.6 volts.

A pulse width modulation (PWM) modulator 540 includes an operational amplifier 310, a comparator 320, an anti-overlap circuit 390, a negative feedback circuit 370 and a positive feedback circuit 360 shown in FIG. 6. A P-type switch 520 and an N-type switch 530 correspond to a power switch 340 shown in FIG. 6. A filter 550 corresponds to a filter 350 shown in FIG. 6. A voltage source VBAT corresponds to an input signal VI shown in FIG. 6.

Referring to FIG. 13, the DC-DC converter includes an input voltage VBAT, the P-type switch 520, the N-type switch 530, the PWM modulator 540 and the filter 550. A resistor RL shown in FIG. 13 represents a load resistor.

The PWM modulator 540 positively feeds back a pulse width modulated signal VLX to generate an oscillated signal, and negatively feeds back a direct current output voltage signal VO to compare the fed-back direct current output voltage signal VO with a reference signal VREF. The PWM modulator 540 generates switching signals VP and VN so that the direct current output voltage signal VO follows the reference signal VREF, performing the pulse width modulation (PWM).

When the switching signal VP is at a logic 'high' state and the switching signal VN is at a logic 'low' state, both of the P-type switch 520 and the N-type switch 530 are turned off. When both of the switching signals VP and VN are at the logic 'low' state, the P-type switch 520 is turned on and the N-type switch 530 is turned off, and the input voltage VBAT is outputted through the filter 550. When both the switching signals VP and VN are at the logic 'high' state, the P-type switch 520 is turned off and the N-type switch 530 is turned on. Accordingly, the input voltage VBAT is not provided to an output node, and a current path through an inductor L is formed by the N-type switch 530. The DC-DC converter shown in FIG. 13 outputs a stable direct current voltage of about 0 volts through about 3.6 volts.

As described above, the DC-DC converter according to exemplary embodiments of the present invention is capable of controlling a pulse width and a pulse frequency using a modified Schmitt trigger circuit and without using a hysteretic comparator. The DC-DC converter according to exemplary embodiments of the present invention may provide a stable direct current output voltage.

Additionally, the DC-DC converter according to exemplary embodiments of the present invention may reduce an integrated circuit (IC) chip size, for example, because an oscillator is not required.

The DC-DC converter according to exemplary embodiments of the present invention may quickly obtain a low output voltage by lowering a frequency of a pulse width modulated signal.

Although the exemplary embodiments of the present invention have been described with reference to the accompanying drawings for the purpose of illustration, it is to be understood that the inventive processes and apparatus are not to be construed as limited thereby. It will be readily apparent to those of ordinary skill in the art that various modifications to the foregoing exemplary embodiments may be made without departing from the scope of the invention as defined by the appended claims, with equivalents of the claims to be included therein.

What is claimed is:

1. A DC-DC converter comprising:
   a pulse width modulation (PWM) modulator configured to positively feed back a pulse width modulated signal of which a pulse width and a frequency are varied to generate an oscillated signal, configured to amplify a difference between a negatively fed-back direct current output signal and a reference signal to output a first signal, and configured to compare the first signal with the oscillated signal to generate a first switching signal and a second switching signal;
   a power switch configured to transfer an input signal to a first output node in response to the first switching signal and the second switching signal, and configured to generate the pulse width modulated signal, wherein the pulse width modulated signal is provided to the first output node; and
   a filter configured to generate a direct current output voltage signal in response to the pulse width modulated signal, wherein the direct current output voltage signal is provided to a second output node.

2. A DC-DC converter comprising:
   amplifier configured to amplify a difference between a reference signal and a first feedback signal to generate a first signal;
   a comparator configured to compare a second feedback signal with the first signal to generate a second signal;
   a switch driver configured to generate a first switching signal and a second switching signal in response to the second signal;
   a power switch configured to transfer an input signal to a first output node in response to the first switching signal and the second switching signal, and configured to generate a pulse width modulated signal of which a pulse width and a frequency are varied, wherein the pulse width modulated signal is provided to the first output node;

a filter configured to generate a direct current output voltage signal in response to the pulse width modulated signal, wherein the direct current output voltage signal is provided to a second output node;

a negative feedback circuit configured to generate the first feedback signal in response to the direct current output voltage signal; and a positive feedback circuit configured to generate the second feedback signal oscillated in response to the pulse width modulated signal.

3. The DC-DC converter of claim 2, wherein the first feedback signal is provided by dividing the direct current output voltage signal by a predetermined resistance ratio.

4. The DC-DC converter of claim 3, wherein the negative feedback circuit comprises:
a first resistor having a first terminal coupled to the second output node and a second terminal coupled to an inverting input terminal of the amplifier; and
a second resistor coupled between the second terminal of the first resistor and a low power voltage.

5. The DC-DC converter of claim 3, wherein the positive feedback circuit comprises a capacitive element.

6. The DC-DC converter of claim 5, wherein the positive feedback circuit comprises:
a resistor having a first terminal coupled to the first output node and a second terminal coupled to a non-inverting input terminal of the comparator; and
a capacitor coupled between the second terminal of the resistor and the low power voltage.

7. A DC-DC converter comprising:
an amplifier configured to amplify a difference between a reference signal and a first feedback signal to generate a first signal;
a comparator configured to compare a second feedback signal with the first signal to generate a second signal;
an anti-overlap circuit configured to generate a first pulse signal and a second pulse signal in response to the second signal, the second pulse signal having a second pulse width wider than a first pulse width of the first pulse signal;
a switch driver configured to generate a first switching signal and a second switching signal in response to the first pulse signal and the second pulse signal;
a power switch configured to transfer an input signal to a first output node in response to the first switching signal and the second switching signal, and configured to generate a pulse width modulated signal of which a pulse width and a frequency are varied, wherein the pulse width modulated signal is provided to the first output node;
a filter configured to generate a direct current output voltage signal in response to the pulse width modulated signal, wherein the direct current output voltage signal is provided to a second output node;
a negative feedback circuit configured to generate the first feedback signal in response to the direct current output voltage signal; and
a positive feedback circuit configured to generate the second feedback signal oscillated in response to the pulse width modulated signal.

8. The DC-DC converter of claim 7, wherein a pulse width of the second pulse signal is larger than that of the first pulse signal by as much as a first width in a first direction, and the pulse width of the second pulse signal is larger than that of the first pulse signal by as much as a second width in a second direction, the second direction being opposite to the first direction.

9. The DC-DC converter of claim 7, wherein the anti-overlap circuit comprises:
a first inverter configured to invert the second signal;
a first NOR gate configured to perform a logical NOR operation on the second signal and a third signal;
a first capacitive element coupled to an output terminal of the first NOR gate;
a second inverter configured to invert an output signal of the first NOR gate;
a third inverter configured to invert an output signal of the second inverter to generate a fourth signal;
a fourth inverter configured to invert an output signal of the third inverter to generate the second pulse signal;
a second NOR gate configured to perform a logical NOR operation on an output signal of the first inverter and the fourth signal;
a second capacitive element coupled to an output terminal of the second NOR gate;
a fifth inverter configured to invert an output signal of the second NOR gate;
a sixth inverter configured to invert an output signal of the fifth inverter to generate the third signal; and
a seventh inverter configured to invert an output signal of the fifth inverter to generate the first pulse signal.

10. The DC-DC converter of claim 7, wherein the anti-overlap circuit comprises:
a first inverter configured to invert the second signal;
a first NOR gate configured to perform a logical NOR operation on the second signal and a third signal;
a first capacitive element coupled to an output terminal of the first NOR gate;
a second inverter configured to invert an output signal of the first NOR gate;
a third inverter configured to invert an output signal of the second inverter to generate a fourth signal;
a first NAND gate configured to perform a logical NAND operation on an output signal of the third inverter and a power down signal to generate the second pulse signal;
a second NOR gate configured to perform a logical NOR operation on an output signal of the first inverter and the fourth signal;
a second capacitive element coupled to an output terminal of the second NOR gate;
a fourth inverter configured to invert an output signal of the second NOR gate;
a fifth inverter configured to invert an output signal of the fourth inverter to generate the third signal; and
a second NAND gate configured to perform a logical NAND operation on an output signal of the fourth inverter and the power down signal to generate the first pulse signal.

11. A method of modulating a pulse width, comprising:
positively feeding back a pulse width modulated signal to generate an oscillated signal;
negatively feeding back a direct current output signal;
amplifying a difference between the negatively fed-back direct current output signal and a reference signal to output a first signal;
comparing the first signal with the oscillated signal to generate a first switching signal and a second switching signal;

amplifying a difference between the negatively fed-back direct current output signal and the reference signal, comparing the oscillated signal with the reference signal and generating the first switching signal and the second switching signal, wherein the direct current output signal follows the reference signal;

transferring an input signal to a first output node in response to the first switching signal and the second switching signal to generate a pulse width modulated signal of which a pulse width and a frequency are varied at the first output node; and generating a direct current output voltage signal at a second output node in response to the pulse width modulated signal.

* * * * *